United States Patent [19]

Huber

[11] 4,330,185
[45] May 18, 1982

[54] APPARATUS FOR EXPOSING, DEVELOPING AND DISPOSING OF REMNANTS OF FILM UNITS

[75] Inventor: Hans-Peter Huber, Munich, Fed. Rep. of Germany

[73] Assignee: AGFA-Gevaert Aktiengesellschaft, Leverkusen, Fed. Rep. of Germany

[21] Appl. No.: 112,222

[22] Filed: Jan. 15, 1980

[30] Foreign Application Priority Data

Jan. 19, 1979 [DE] Fed. Rep. of Germany ....... 2902066

[51] Int. Cl.³ .............................................. G03B 17/50
[52] U.S. Cl. .................................................... 354/86
[58] Field of Search ................. 206/455, 456; 354/83, 354/86, 75, 275, 276, 87, 277; 430/210

[56] References Cited

U.S. PATENT DOCUMENTS

| | | | |
|---|---|---|---|
| 2,458,186 | 1/1949 | Messina et al. | 354/87 |
| 3,702,579 | 11/1972 | Nerwin | 430/210 |
| 3,767,404 | 10/1973 | Harvey | 430/210 |
| 3,782,257 | 1/1974 | Harvey | 354/275 |

FOREIGN PATENT DOCUMENTS 1300436 4/1970 Fed. Rep. of Germany ........ 354/86

OTHER PUBLICATIONS

Research Disclosure No. 176, Dec. 1978, Self Processing Film Units 17622.

Primary Examiner—Donald A. Griffin
Attorney, Agent, or Firm—Kontler & Grimes

[57] ABSTRACT

The remnants of film units which are withdrawn from a cassette in the housing of a camera for instant photography are reintroduced into the cassette subsequent to development of images and separation of image-bearing sheets. The reintroduction can be effected by a manually operated yoke, by the pressure applying rolls which serve to spread a fluid processing agent between the positive and negative sheets of an exposed film unit, by an additional roll in cooperation with one of the pressure applying rolls, or by a separate set of advancing rolls.

43 Claims, 15 Drawing Figures

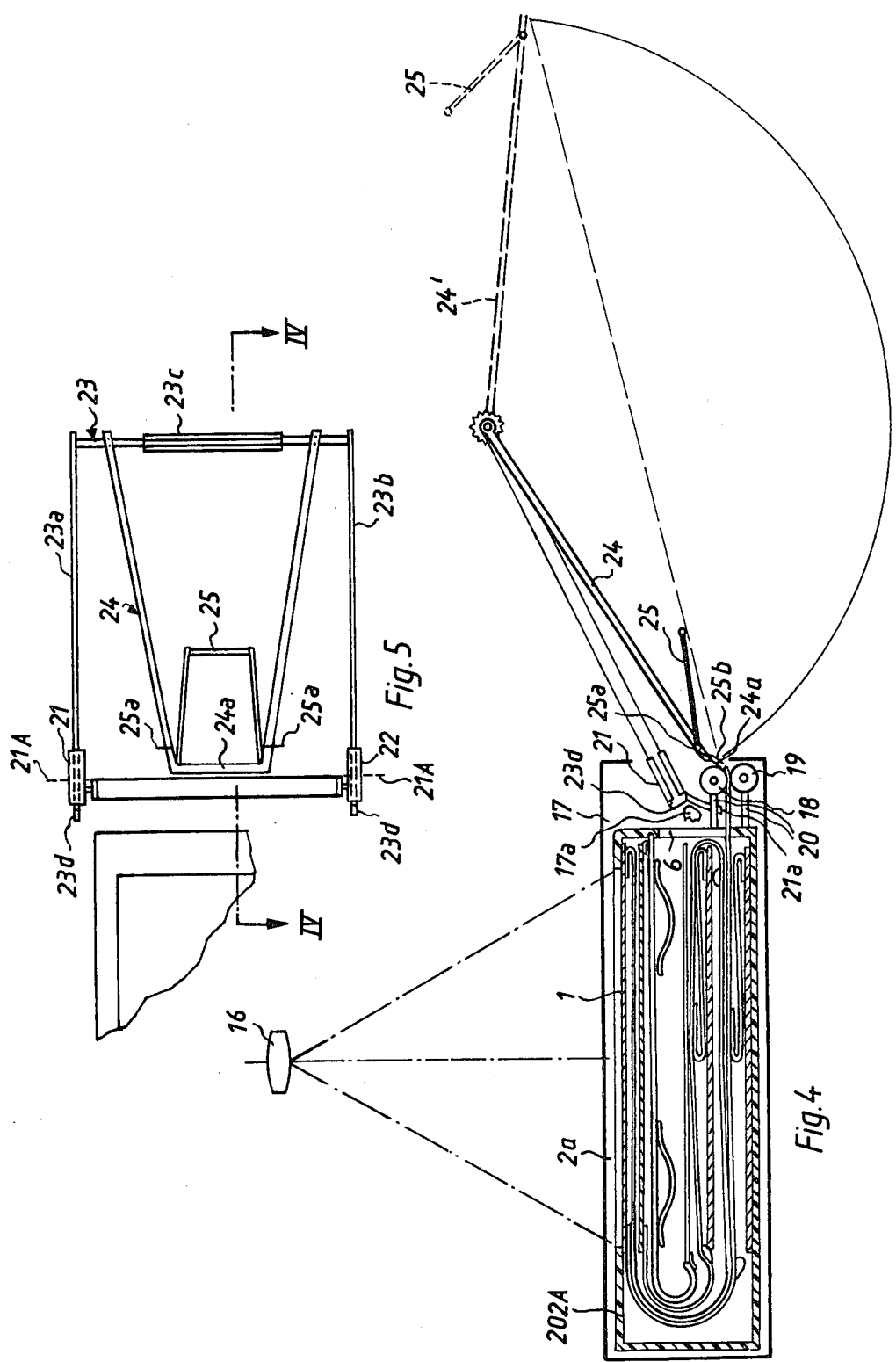

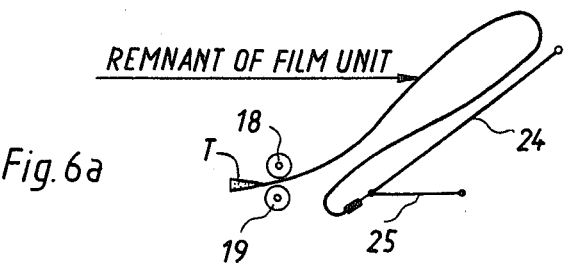
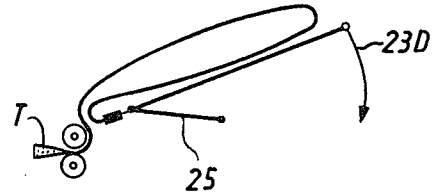
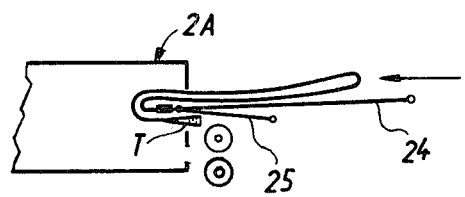
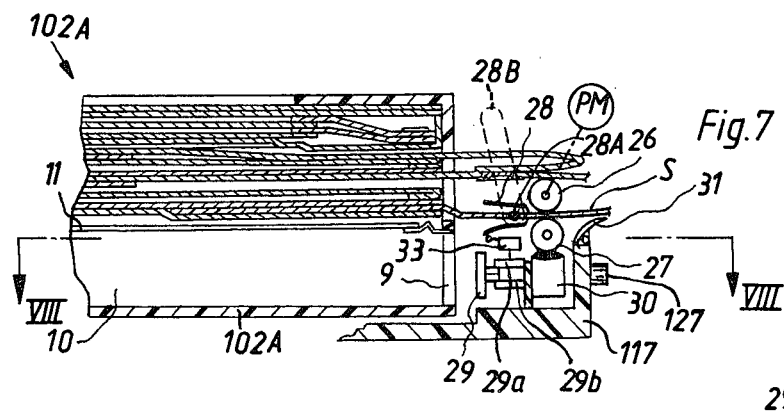
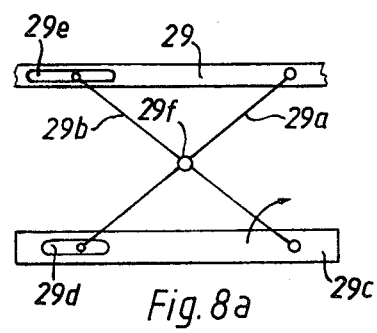
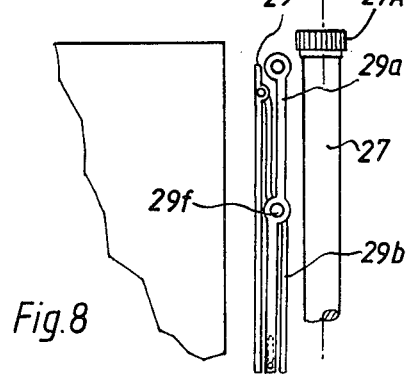

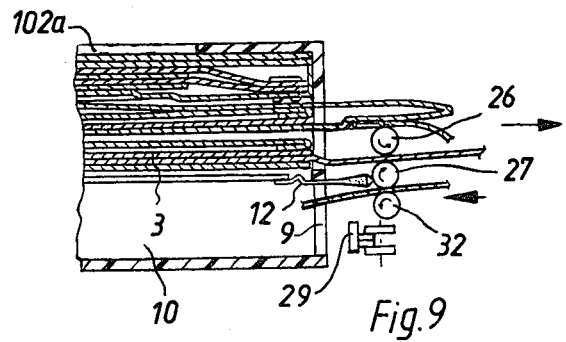
Fig. 9
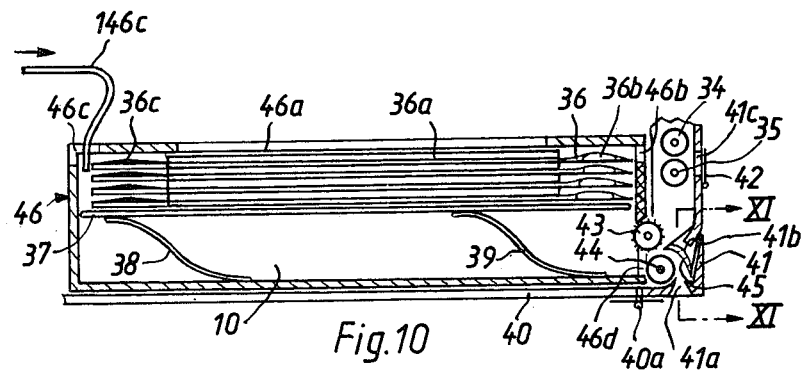
Fig. 10
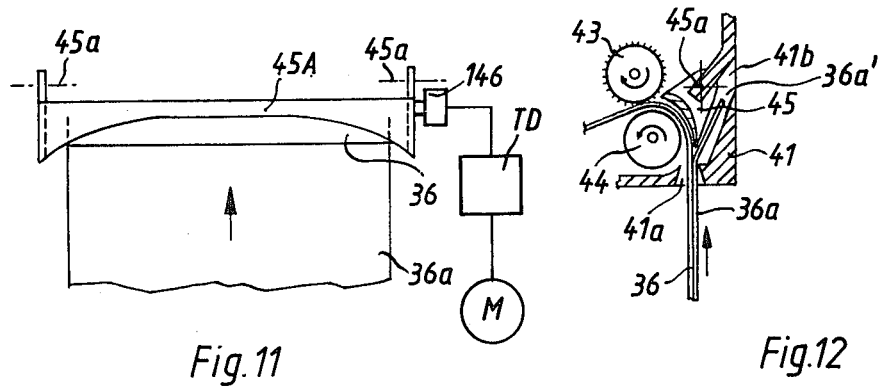
Fig. 11
Fig. 12

APPARATUS FOR EXPOSING, DEVELOPING AND DISPOSING OF REMNANTS OF FILM UNITS

BACKGROUND OF THE INVENTION

The present invention relates to the making of instant images in general, and more particularly to improvements in a method and apparatus for making instant images in accordance with the diffusion transfer technique. Still more particularly, the invention relates to a method of manipulating various types of film units, to an apparatus which can be used for the practice of such method, and to improvements in containers or cassettes for supplies of film units.

U.S. Pat. No. 2,458,186 granted Jan. 4, 1949 to Messina et al. discloses a photographic apparatus which uses film units of the type wherein a negative sheet which is to be exposed to light and a positive sheet which is to bear the image overlap each other during transport through the nip of pressure applying rolls which cause a pod for a supply of fluid processing agent to burst open and to permit the processing agent to spread between the positive and negative sheets. The two sheets are separated from each other upon completion of the developing step. The developing step is completed within a certain interval of time, e.g., approximately one minute. When the image-bearing positive sheet is separated from the negative sheet, from the pod and from a customary trap for the surplus of processing agent, the user of the photographic apparatus is often confronted with the problem of disposing with the remnant of the film unit. Such problem is aggravated by the fact that the processing agent contains certain aggressive chemicals which coat a portion of the remnant of the film unit, namely, that portion which includes the exposed negative sheet, the pod and the trap. In many situations, the disposal of such remnant upon completion of the developing step is quite problematic, e.g., when the user of the apparatus is not permitted to drop the remnant on the ground or the user cannot avail himself or herself of a waste basket or another suitable receptacle for disposable commodities or substances.

A film unit of the type used in the apparatus of Messina et al. includes an image bearing positive sheet as well as a remnant consisting of an exposed sheet, an evacuated pod, a trap for surplus processing agent as well as a frame for the image-bearing component. The photographic apparatus of Messina et al. employs a drum or roll which collects the remnants of successive film units. The drum can be removed from the housing of the photographic apparatus and can be discarded together with the convoluted waste material. Such apparatus failed to gain widespread acceptance for numerous reasons. Thus, the patentees draw the positive and negative sheets from discrete reels. This limits the number of image sizes which can be obtained in such apparatus. Furthermore, the drum for waste material and the remnants which are convoluted thereon occupy a substantial amount of space so that the patented apparatus is rather bulky. Still further, the user must carry along a supply of spare drums in addition to supplies of reels with positive and negative sheets. All this contributes to complexity and cost of the patented apparatus and involves a substantial amount of work upon completion of a certain number of exposures.

U.S. Pat. No. 3,767,404 granted Oct. 23, 1973 to Harvey discloses a modified photographic apparatus for use with film units, each of which contains a relatively stiff sheet which is called a card and constitutes a carrier for the pod and for the trap. The card further supports a sheet of negative material and the image-receiving sheet, and such sheets are readily separable from the carrier. The patented photographic apparatus embodies means for separating the two sheets from the carrier or card immediately after passage through the nip of the pressure applying rolls. The carrier or card is flexed and introduced into an empty portion of the interior of a container for film units. A drawback of the patented apparatus is that it must employ the just discussed complex and highly expensive film units wherein the negative and image bearing sheets are separably attached to a card-like carrier which latter further supports a pod and a trap for the surplus of fluid processing agent.

It is also known to employ so-called instant-image cameras which utilize film units of the type known as monopanel film units. One of the two sheets in such film units transmits light so that the exposure can be made while the two sheets (namely, the light-transmitting sheet and the other sheet) overlap each other in the interior of the camera housing during exposure of the respective unit to scene light. In such monopanel film units, the pod and the trap are integrated into the unit, and the developing step need not be followed by a separating step because the entire film unit constitutes a photographic print. The reproduced image is observed through the light-transmitting sheet of the film unit, and the pod as well as the trap remain in the ultimate product. A drawback of such ultimate products is that they are rather stiff and relatively thick, especially in the region of the trap for the surplus processing agent. Moreover, the presence of a surplus of fluid processing agent in the ultimate product is likely to create problems, especially as concerns the quality of the image and/or the likelihood of contamination of objects which come in contact with the final product.

OBJECTS AND SUMMARY OF THE INVENTION

An object of the invention is to provide a novel and improved method of disposing of the remnants of film units in such a way that the remnants cannot contaminate the hands of the user of the photographic apparatus and/or the reproductions of the images of subjects or scenes.

Another object of the invention is to provide a novel and improved method of confining the remnants of film units in the housing of the photographic apparatus wherein such film units are exposed and developed.

A further object of the invention is to provide a method of manipulating the constituents of film units subsequent to exposure of such film units in a photographic apparatus for instant photography.

An additional object of the invention is to provide novel and improved containers for storage of film units which can be manipulated in accordance with the above outlined method.

Another object of the invention is to provide novel and improved photographic apparatus for use with film units, and to provide such apparatus with novel and improved means for manipulating film units subsequent to exposure of the film units to scene light.

An additional object of the invention is to provide a photographic apparatus which is sufficiently simple to be safely manipulated by unskilled persons, which is constructed and assembled in such a way that wet remnants of film units need not be touched by hand after completion of the developing and exposing steps, and which can store the remnants of a full complement of film units in a small area which is readily available in the apparatus without resort to relatively large, bulky and expensive camera bodies.

One feature of the invention resides in the provision of a method of manipulating exposed self-processing film units which are preferably stacked to form film packs and are stored in a cassette or an analogous container during exposure to scene light while the container or cassette is confined in the housing or body of a photographic apparatus, wherein each film unit comprises an image-bearing portion and a second portion which constitutes a remnant or waste material upon completion of the developing operation, and wherein the developing operation or step involves spreading a fluid processing agent between the two portions of a freshly exposed film unit. The method comprises the steps of separating the first and second portions of successive developed and exposed film units from each other, and introducing the separated second portions of film units into the container in the housing of the photographic apparatus.

The separating step is preferably carried out in the region of the housing of the photographic apparatus. For example, each film unit may include a part (such part preferably constitutes a component of the second portion of the respective film unit) which is confined in the housing of the photographic apparatus in the course of the separating step.

The separation of first and second portions of an exposed and developed film unit from each other can take place during withdrawal of the major part of such film unit from the housing of the photographic apparatus or subsequent to withdrawal of the entire film unit and during reinsertion of the film unit into the housing (whereby the first portion is separated from the second portion and is simultaneously expelled from the housing while the second portion, i.e., the waste material, enters the container or cassette in the interior of the housing).

The method may further comprise the step of completely withdrawing each exposed film unit from the container and from the housin prior to the separating step.

Alternatively, the method may further comprise the step of partially withdrawing each exposed film unit from the container and from the housing in the course of the separating step. The withdrawing step may comprise moving the film units along a first path, and the introducing step may comprise moving the second portions of film units along a different second path.

The introducing step may include indirectly inserting the second portions of successive film units into the container by hand (e.g., by resorting to a yoke which can be manipulated by hand through the medium of a lever or the like).

Successively introduced second portions of exposed and developed film units can be stacked in the interior of the container, e.g., between stacks of positive and negative sheets or behind the stacks of positive and negative sheets.

The method may further comprise the step of compacting the second portions of film units in the container. Such compacting step can be carried out simultaneously with the introducing step, e.g., the compacting step may be a direct consequence or necessary adjunct of introduction of the second portions of film units into the container.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4 is a fragmentary schematic partly elevational and partly sectional view of a photographic apparatus which can utilize cassettes of the type shown in FIG. 3;

FIG. 5 is a plan view of a portion of the photographic apparatus of FIG. 4;

FIG. 6a illustrates a first phase of introduction of the remnant of a film unit into the waste chamber of a cassette in the housing of the photographic apparatus of FIGS. 4 and 5;

FIG. 6b illustrates a further stage of introduction of such remnant into the waste chamber;

FIG. 6c illustrates still another stage of introduction of the remnant into the waste chamber;

FIG. 7 is a fragmentary partly elevational and partly sectional view of a second photographic apparatus which is used with cassettes of the type shown in FIG. 2 and includes power-operated means for introducing the remnants of film units into the waste chamber of the cassette;

FIG. 8 is an enlarged fragmentary plan view as seen in the direction of arrows from the line VIII—VIII of FIG. 7;

FIG. 8a is a plan view of a compacting device in the photographic apparatus of FIG. 7;

FIG. 9 is a fragmentary partly elevational and partly sectional view of a third photographic apparatus which constitutes a modification of the apparatus of FIGS. 7, 8, 8a and can utilize cassettes of the type shown in FIG. 2;

FIG. 10 is a fragmentary partly elevational and partly sectional view of a fourth photographic apparatus and a longitudinal sectional view of a cassette for modified film units having light-transmitting sheets and being suitable for use in such apparatus.

FIG. 11 is a view of a detail as seen in the direction of arrows from the line XI—XI of FIG. 10; and FIG. 12 is an enlarged view of the lower right-hand portion of the apparatus shown in FIG. 10.

DESCRIPTION OF THE PREFERRED EMBODIMENTS

Figure 1:
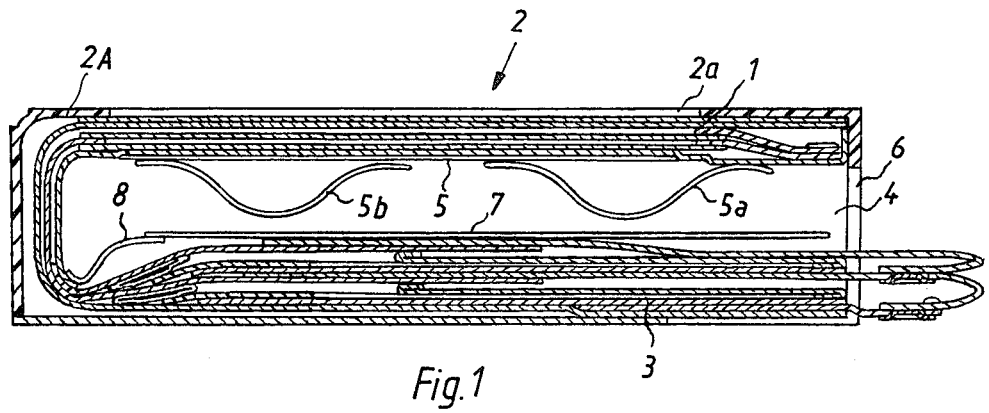
FIG. 1 is a somewhat schematic longitudinal sectional view of a cassette for film units of a first type, the waste chamber being disposed between two discrete stacks of sheets in the cassette.

The film pack 2 of FIG. 1 comprises a container or cassette 2A for a stack of photosensitive negative sheets 1 the outermost component of which is adjacent to a light-admitting aperture 2a in the top wall of the cassette 2A. The interior of the cassette 2A further accommodates a stack of image receiving positive sheets 3 with receptacles (hereinafter called pods) for a fluid processing agent or composition. The stacks of sheets 1 and 3 are disposed at the opposite sides of a waste chamber 4 which is accessible by way of an opening 6 in a side wall of the cassette 2A. The height of the waste chamber 4, as considered at right angles to the planes of the sheets 1 and 3, can be ascertained by simple experimentation. That side of the chamber 4 which is adjacent to the stack of sheets 1 is bounded by a relatively stiff pressure plate 5. The latter is biased upwardly, as viewed in FIG. 1, by several sets of leaf springs 5a, 5b. The leaf springs 5a, 5b are disposed in front of and behind the sheets 1 and 3 (FIG. 1 merely shows the springs 5a, 5b behind such sheets) close to the corresponding end walls of the cassette 2A. One end portion of end spring (5a, 5b) is secured to the pressure plate 5 and the other end portion is affixed to the cassette 2A so that the springs bias the pressure plate 5 against the innermost negative sheet 1 and thereby maintain the outermost sheet 1 in the focal plane in immediate proximity of the light-admitting aperture 2a.

Figure 3:
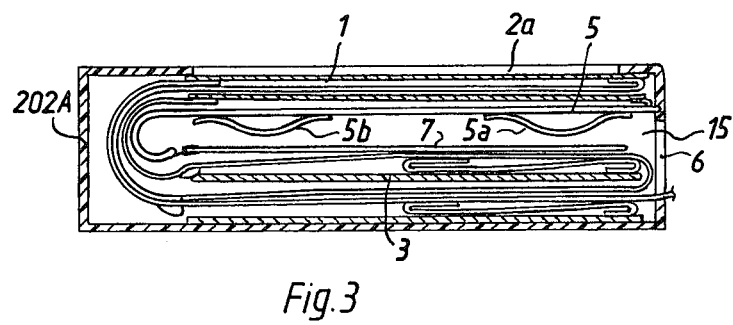
FIG. 3 is a similar schematic longitudinal sectional view of a third cassette which resembles the cassette disclosed in German Pat. No. 1,300,436 as well as the cassette of FIG. 1 because the waste chamber is disposed between two stacks of sheets.

A second plate or partition 7 is adjacent to the other side of the waste chamber 4 and abuts against the innermost sheet 3. The plate 7 is relatively stiff and that marginal portion thereon which is remote from the aperture 6 is articulately connected to the corresponding side wall of the cassette 2A by a simple hinge, e.g., by an elastic web 8. Alternatively, and as shown in FIG. 3, the plate 7 can be articulately connected to a downwardly extending concavo-convex arcuate marginal portion of the pressure plate 5. That marginal portion of the plate 7 which is adjacent to the opening 6 is movable toward and away from the corresponding marginal portion of the pressure plate 5. The just described mounting of the plate 7 renders it possible to enlarge the volume of the waste chamber 4 proportionally with a decrease of the combined height of the stacks of sheets 1 and 3. Thus, the plate 7 can move away from the aperture 2a when a sheet 3 is withdrawn from the cassette 2A so that the capacity of the cassette for storage of waste material increases proportionally with a reduction of the number of film units therein. The springs 5a, 5b contribute to the accumulation of a pile of waste material in a manner to be described in connection with FIGS. 4 to 6.

Figure 2:
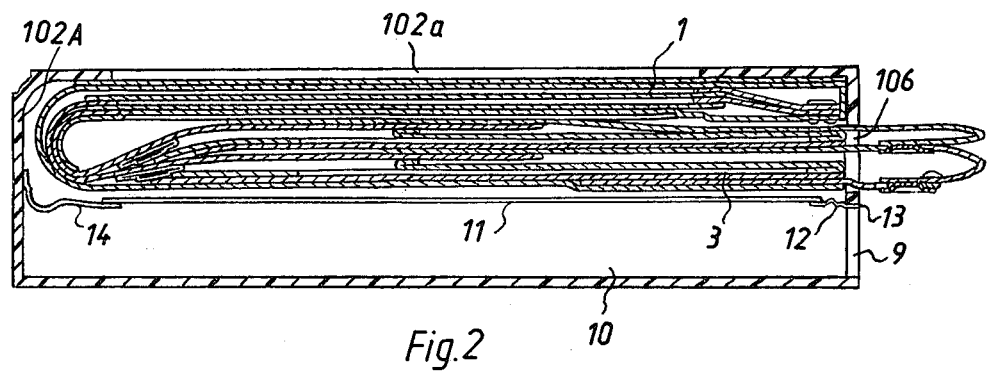
FIG. 2 is a somewhat schematic longitudinal sectional view of a second cassette wherein the waste chamber is disposed behind the two stacks of sheets.

The cassette 102A of FIG. 2 confines a stack of negative sheets 1 which are adjacent to the light-admitting aperture 102a and a stack of image-receiving positive sheets 3 which are immediately adjacent to the innermost sheet 1. The opening 106 serves for withdrawal of film units, and the right-hand side wall 13 of the cassette 102A has a second opening 9 which allows for introduction of waste material into a waste chamber 10. The latter is inwardly adjacent to the innermost positive sheet 3. A rigid plate or partition 11 is disposed between the innermost sheet 3 and the waste chamber 10. The right-hand marginal portion of the plate 11 is articulately connected to the side wall 13 by a simple hinge in the form of an elastic foil 12 consisting of a suitable synthetic plastic material. The left-hand marginal portion of the plate 11 is articulately connected with the other side wall of the cassette 102A by a second elastic hinge or foil 14. Thus, here too, the volume of the waste chamber 10 increases proportionally with a reduction of the combined height of the stacks of sheets 1 and 3. The manner in which waste material is introduced into the chamber 10 will be described with reference to FIGS. 7, 8 and 8a.

The cassette 202A of FIG. 3 is similar to the cassette 2A; therefore, the reference characters denoting elements which are analogous to those forming part of or confined in the cassette 2A are denoted by the reference characters used in FIG. 1. A cassette which is similar to the cassette 202A of FIG. 3 is further disclosed in German Pat. No. 1,300,436 to which reference may be had, if necessary. An advantage of the cassette 202A is that the leaders of successive film units need not be manually introduced into the nip or bite of the pressure applying rolls which cause the pods to burst open and which also cause uniform spreading of the thus released fluid processing composition between the overlapping sheets 1, 3 of the respective film unit. This is due to the fact that the trailing end of each preceding film unit is coupled to the leader of the next-following unit by a flexible connecting strip. More particularly, the trailing end of the negative sheet 1 in the preceding film unit is coupled to the leader of the film unit which follows. Consequently, withdrawal of a preceding film unit from the cassette 202A automatically entails the introduction of the leader of the next film unit into the nip of the pressure applying rolls.

In the cassette 202A, the waste chamber 15 is disposed between the stacks of sheets 1 and 3. The opening 6 (which is adjacent to the aforementioned pressure applying rolls) is relatively wide so as to afford access to the chamber 15. The mounting of the pressure plate 5, leaf springs 5a, 5b and second plate or partition 7 is the same as or analogous to that shown in FIG. 1. The volume of the chamber 15 increases proportionally with a reduction of the combined height of the stacks of sheets 1 and 3, i.e., at a rate which is a function of the number of film units in the cassette 202A.

FIGS. 4 and 5 show certain components of a photographic apparatus which can utilize cassettes 202A of the type shown in FIG. 3. The apparatus comprises an optical system 16 which images a selected subject or scene onto the outermost negative sheet 1, i.e., onto the sheet 1 which is disposed in the focal plane immediately behind the light-admitting aperture 2a. The housing or body of the photographic apparatus is shown schematically at 17. The opening 6 of the cassette 202A is adjacent to two pressure applying rolls 18, 19 which are installed in the housing 17 and are biased against each other by elastic arms 20. These rolls serve to spread a fluid processing agent between the first and second portions of the exposed film units.

The housing 17 has a door (not specifically shown) which allows for insertion or withdrawal of cassettes 202A, i.e., the housing 17 constitutes a means for supporting a cassette or container during exposure and development of the corresponding film units. Furthermore, the housing 17 contains a fulcrum 21A (denoted by broken lines) for two pivotable guides 21, 22. The axis which is defined by the fulcrum 21A is parallel to the axes of the pressure applying rolls 18, 19. The guides 21, 22 define paths for the reciprocable legs 23a, 23b of a displacing member here shown as a U-shaped yoke 23. The legs 23a, 23b can be pushed (inserted) into the interior of or withdrawn (retracted) from the housing 17, and the plane of the yoke 23 is or can be substantially parallel to the plane of the foremost unexposed negative sheet 1. The yoke 23 further comprises a web 23c which extends transversely between the outer end portions of the legs 23a, 23b and constitutes a handle which is grasped by hand when the user wishes to withdraw the legs 23a, 23b from or to insert these legs into the housing 17. The inner end portions of the legs 23a, 23b are enlarged, as at 23d, so as to prevent complete retraction of the yoke 23 from the housing 17.

The guides 21, 22 respectively comprise extensions of which only the extension 21a of the guide 21 can be seen in the drawing. The extension 21a engages the deformable elastic arm 20 for the pressure applying roll 18 and moves the latter away from the roll 19 when the yoke 23 is moved to a position of substantial parallelism with the exposure plane. When the extension 21a (as well as the extension of the guide 22) allows the arm 20 for the pressure applying roll 18 to urge the latter against the roll 19, the yoke 23 is located in a plane which makes a relatively small acute angle (e.g., an angle of approximately 30 degrees) with the plane of the foremost or outermost negative sheet 1 in the cassette 202A.

The handle or web 23c of the yoke 23 defines a pivot axis for a substantially trapeziform lever 24 which is biased by a suitable spring (e.g., a torsion spring, not shown, which is coiled around the handle 23) so as to be normally held in the solid-line position of FIG. 4. By overcoming the bias of such spring, the user of the photographic apparatus can pivot the lever 24 into the plane of the yoke 23, i.e., into the space between the legs 23a, 23b. The lever 24 can be arrested against pivotal movement beyond the position of coplanarity with the legs 23a, 23b by suitable stop means, e.g., on the handle 23c of the yoke 23.

When the lever 24 is allowed to assume the solid-line position of FIG. 4, its free end portion 24a (this end portion is remote from the handle 23c) is immediately adjacent to the nip of the pressure applying rolls 18, 19, namely, it is located at that side of the nip which is remote from the opening 6 of a properly inserted cassette 202A. The lever 24 carries a gripping member 25 (e.g., a lug) which is pivotable about an axis defined by the end portion 24a or about an axis 25a which is parallel to the end portion 24a. That end portion (25b) of the gripping member 25 which extends inwardly beyond the axis 25a constitutes one jaw of a tongs which further includes an additional jaw, namely, the end portion 24a of the lever 24. When the tongs 25b, 24a is operative, it engages and grips the leader of the foremost film unit at a locus outwardly of the nip of the pressure applying rolls 18, 19.

The housing 17 of the photographic apparatus further comprises or contains an abutment 17a which allows the yoke 23 to pivot to the solid-line position of FIG. 4 (at an angle of approximately 30 degrees to the exposure plane) when the yoke 23 has been moved to the fully extended position, namely, when the enlarged inner end portions 23d of the legs 23a, 23b abut against the respective guides 21, 22. Once the yoke 23 is located in the fully extended position and is pivoted to the solid-line position of FIG. 4, the abutment 17a is located in the path of inward movement of the enlarged portions 23d and prevents the legs 23a, 23b from moving into housing 17. Thus, in order to conceal the major portion of the yoke 23 in the housing 17, it is necessary to pivot the guides 21, 22 so as to move the enlarged portions 23d out of register with the abutment 17a.

The operation of the photographic apparatus of FIGS. 4 and 5 (with a cassette 202A in the housing 17) is as follows:

Prior to the making of an exposure, the leader of the foremost film unit in the cassette 202A extends through and outwardly beyond the nip of the pressure applying rolls 18, 19. The yoke 23 is held in the solid-line position of FIG. 4 so that the elastic arms 20 cause the rolls 18, 19 to bear against the opposite sides of the leader of the foremost film unit. It is to be noted here that the housing 17 can also receive a cassette 2A (instead of a cassette 202A). If the cassette 202A of FIG. 4 is replaced with a cassette 2A, the leaders of film units in the cassette 2A should be somewhat shorter than customary in order to allow for pivotal movements of the tongs 24a, 24a. The leader of each film unit in the cassette 2A is introduced into the nip of the rolls 18, 19 prior to exposure of the respective film unit to scene light.

When the exposure of the foremost film unit is completed and the leader of such film unit is introduced into the nip of the pressure applying rolls 18, 19, the user of the photographic apparatus engages the gripping member 25, makes sure that the leader of the foremost film unit is located between the jaws 24a, 25b, and gradually but steadily moves the lever 24 to the broken-line position 24' of FIG. 4 by way of the gripping member 25. The dimensions of the film units and of the parts 23, 24, 25 are selected in such a way that the aforementioned movement of the lever 24 to the broken-line position of FIG. 4 results in movement of the foremost film unit through the nip of the rolls 18, 19. However, a portion of the film unit remains in the housing 17. Thus, whereas the positive sheet has advanced beyond the rolls 18, 19, the trap with the remaining (surplus) fluid processing agent remains in the interior of the housing 17. At such time, the foremost film unit is under tension so that it is substantially flat in the entire region between the nip of the rolls 18, 19 and the jaws 24a, 25b. The user then allows a certain interval of time to elapse so as to enable the fluid processing agent to complete the development of the image. In the next step, the positive sheet (which faces downwardly, as viewed in FIG. 4) of the foremost film unit can be separated from the remainder of such film unit.

In the next step, the user causes the optical system 16 to face downwardly (unless such orientation of the photographic apparatus was chosen prior to removal of the positive sheet) and pivots the lever 24 to the solid-line position of FIG. 4 whereby the negative sheet of the foremost film unit (actually of the remnant or waste of such foremost unit) is folded over itself (see FIG. 6a) so that its wet side is concealed. As the lever 24 continues to move between the legs 23a, 23b of the yoke 23, the folding of waste material of the foremost film unit is completed. The yoke 23 is thereupon pivoted against the opposition of the elastically deformable arm 20 for the pressure applying roll 18 (see the arrow 23D in FIG. 6b) so that the yoke is located in the exposure plane (see FIG. 6c). This causes the rolls 18, 19 to define a gap which is sufficiently wide to allow the trap T to pass therethrough while the lever 24 is caused to enter the waste chamber 15 in the cassette 202A. The trapeziform shape of the lever 24 is selected in such a way that this lever can enter (FIG. 6c) the space between the two leaf springs 5a, 5b in the cassette 202A. Thus, when the lever 24 is thereupon withdrawn from the waste chamber 15 the folded or collapsed waste material of the film unit which has been caused to advance through the nip of and beyond the rolls 18, 19 will be advanced toward the stack of sheets 3 in the cassette 202A. Withdrawal of the yoke 23 from the housing 17 (simultaneously with withdrawal of the lever 24 from the chamber 15) takes place prior to the making of the next exposure. The tongs 24a, 25b opens when the lever 24 is introduced into the relatively narrow waster chamber 15 so that the tongs remains open during retraction of the lever 24 from the cassette 202A, i.e., the waste material or the remnant of the last-exposed film unit remains in the chamber 15. The yoke 23 constitutes the main component of means for inserting the second portions or remnants of exposed and developed film units into the chamber 15. Such means further includes the lever 24 and the gripping member 25.

Since the film units in the cassette 202A of FIGS. 3 and 4 are connected to each other by flexible strips, the connecting strip between a remnant in the waste chamber 15 and the foremost complete film unit would cause such remnant to leave the chamber 15 in response to renewed movement of the lever 24 to the broken-line position 24' of FIG. 4. Therefore, the photographic apparatus of FIG. 4 embodies or is combined with mechanical means for severing the connecting strips between the remnants of preceding film units and the next-following (complete) units when the yoke 23 is introduced into the housing 17. Alternatively, the adhesive bond between the end of a negative sheet and the positive sheet must be such that it is weakened by the surplus of fluid processing agent in the trap T (not later than upon completion of a developing step). The weakened adhesive bond can be readily separated or broken; however, it is sufficiently strong to allow for movement of the strip between and beyond the rolls 18, 19 but not to immediately advance the strip into the chamber 15 or to withdraw waste material from the chamber 15 when the yoke 23 is moved to its extended position.

FIGS. 7, 8 and 8a illustrate the developing means of a photographic apparatus which utilizes cassettes of the type shown in FIG. 2. In contrast to the manner of storing waste material or remnants of film units in an orderly fashion as described in connection with FIGS. 1, 3 and 4–6c, the apparatus of FIGS. 7, 8 and 8a stores the remnants of film units in random fashion, i.e., such remnants are not engaged by springs and stored in a more or less orderly manner. The remnants of film units which are stored in the cassette 102A of FIG. 2 are introduced into the waste chamber 10 in folded or unfolded condition and are simply packed in the chamber so as to fill the latter while the introduction of successive remnants proceeds.

FIG. 7 shows that the opening 106 of the cassette 102A is adjacent to two pressure applying rolls 26, 27 which are driven by a reversible prime mover PM, preferably a small electric motor.

A funnel-shaped guide duct 28 is provided between the opening 106 and the pressure applying rolls 26, 27, and such duct tapers in a direction toward the nip of the rolls. The duct 28 is pivotable about an axis 28A which is parallel to the axes of the pressure applying rolls 26, 27. The axis 28A is preferably closely adjacent to the pressure applying rolls. In FIG. 7, the duct 28 is shown in that end position in which its larger-diameter end faces the opening 106 so that the duct can receive the leader of a film unit from the cassette 102A. The duct 28 is pivotable to a second end position in which its larger-diameter end faces the second opening 9 so that the remnant of a film unit can be introduced into the chamber 10. The means for moving the duct 28 between such end positions can be manipulated by hand; for example, the photographic apparatus of FIGS. 7, 8, 8a can be provided with a lever 28B which is accessible at the exterior of the housing 117 of the photographic apparatus and can be moved by hand to turn the shaft which defines the pivot axis 28A between the two end positions. If desired, the photographic apparatus can be provided with one or more suitable springs (not shown) which yieldably urge the duct 28 to the one or the other end position. For example, the arrangement may be such that the duct 28 automatically snaps over to assume the other end position upon completion of movement through more than 50 percent of the distance from the one end position, and vice versa. Such spring or springs are desirable in order to prevent accidental movements of the duct 28 from the selected end position.

When the duct 28 is moved to its second end position, namely, to the position in which its larger-diameter end faces the second opening 9 in the respective side wall of the cassette 102A, the duct 28 actuates an electric switch 33 which reverses the direction of operation of the prime mover PM for the pressure applying rolls 27, 28. The prime mover PM then drives the rolls 26, 27 in such direction that the remnant of a film unit is advanced into the duct 28 and thence into the waste chamber 10 via opening 9.

The photographic apparatus of FIGS. 7, 8 and 8a further comprises a compacting or compressing device 29 which is normally located at the outer side of the second opening 9 and includes or constitutes a reciprocable plunger adapted to move into and to be retracted from the waste chamber 10. The means for reciprocating the compacting device 29 is preferably actuated during the last stage of introduction of the remnant of a film unit into the chamber 10 so as to cause the device 29 to penetrate into the chamber 10 via opening 9 and to thereby reduce the dimensions of the freshly admitted remnant. The device 29 extracts the trailing portion of a remnant from the nip of the pressure applying rolls 26, 27 and also applies a compressing or compacting force to the waste material which is already stored in the chamber 10 so as to ensure that the chamber 10 can receive the remnants of all of the film units which are stored in a fresh cassette 102A.

The means for reciprocating the compacting device 29 is shown in FIGS. 8 and 8a. The illustrated device 29 is an elongated narrow plate whose width is somewhat less than the width of the slot-shaped second opening 9 and whose length is slightly less than the length of the opening 9. The reciprocating means resembles the mechanism which is used in certain types of large cameras to expand or contract the bellows supporting the picture taking lens. As shown in FIG. 8a, the reciprocating means comprises a stationary carrier 29c, a first link 29a one end portion of which is slidable in a slot 29d of the carrier 29c, and a second link 29b one end portion of which is pivotally mounted in the carrier 29c. The other end portion of the link 29a is articulately connected to the compacting device 29, and the other end portion of the link 29b is reciprocable in a slot 29e of the device 29. The one end portion of the link 29b is turnable back and forth by a reversible motor in the housing 117. The extent of forward and rearward movement of the compacting device 29 (namely, the extent of movement of this device upwardly and downwardly, as viewed in FIG. 8a) preferably equals or approximates a predetermined fraction of the depth of the waste chamber 10 in the cassette 102A. It has been found that waste material in the chamber 10 can be properly compacted if the maximum stroke of the device 29 is approximately one-third of the depth of the chamber 10. The links 29a, 29b are articulately connected to each other, as at 29f.

The motor for the link 29b can transmit torque through a suitable worm drive, a suitable clutch (e.g., a clutch employing a sling- or bow-type spring and an eccentric), in order to eliminate the need for a discrete motor for the compacting device 29, the just mentioned eccentric is preferably mounted on the nearer (27) pressure applying roll so that the direction of movement of the compacting device 29 is a function of the direction of rotation of the roll 27.

The reference character 30 denotes in FIG. 7 a removable wiping device which may constitute a strip of polyurethane foam. This device cleans the peripheral surface of the pressure applying roll 27. It is mounted in such position that the user can gain access thereto for the purpose of inspection or replacement with a fresh wiping device.

The housing 117 of the photographic apparatus of FIGS. 7, 8 and 8a further carries a scraper 31 (e.g., a doctor blade) which can be used to separate the positive sheet from the remnant of the film unit while the remnant is being fed into the waste chamber 10 via duct 28 and opening 9.

The operation of the photographic apparatus of FIGS. 7, 8 and 8a (utilizing a cassette 102A of the type shown in FIG. 2) is as follows:

In FIG. 7, the leader of the foremost film unit is located in the nip of the pressure applying rolls 26, 27 because the leader has been moved to such position by way of the customary strip S attached to the leader. The rolls 26, 27 are set in motion in response to transmission of a signal by an automatic signal generating device (not shown) which monitors the nip or the area of the nip of the rolls 26, 27 for the presence of the leader of a film unit. Alternatively, the prime mover PM for the rolls 26, 27 can be started by hand, e.g., in response to depression of a pushbutton 127 on the housing 117. The aforementioned signal generating device can monitor the position of the roll 27 and/or 28 because the leader of a film unit is normally thicker than the strip S so that the roll 27 moves away from the roll 26 and/or vice versa when the nip of these rolls receives the leader of a film unit. The rolls 26, 27 are rotated in a direction to withdraw the film unit from the interior of the cassette 102A via opening 106. The withdrawing action is terminated in response to generation of a signal by a suitable monitoring device (not shown) or by such dimensioning of the trap for the surplus of fluid processing agent that the trap cannot pass through the nip of the rolls 26, 27. To this end, the photographic apparatus can employ pressure applying rolls having relatively small diameters.

The rolls 26, 27 thereupon remain idle for a certain interval of time which is needed to allow for completion of development of the image. Such completion can be indicated to the user of the camera by a signal which is generated by a suitable time (not shown). The timer is set in motion when the prime mover PM for the pressure applying rolls 26, 27 is arrested and the timer preferably transmits an electric signal which causes the duct 28 to assume its other end position (in which the larger-diameter end of the duct faces the opening 9). Alternatively, the timer can be used to generate a readily detectable (visible and/or audible) signal which informs the user that the position of the duct 30 can be changed by the lever 28B and that the prime mover PM can be started in reverse to move the expelled film unit toward the chamber 10 whereby the scraper 31 automatically separates the positive sheet (first portion) from the remnant or second portion of such film unit. If desired, the prime mover PM can be reversed by the scraper 31 (which can be designed to transmit a signal when the separation of a positive sheet is completed). The movement of the chute or duct 28 to the second end position results in actuation of the switch 33 which reverses the direction of rotation of the prime mover PM. As the prime mover PM rotates in reverse, the pressure applying rolls 26, 27 advance the expelled or extracted film unit in a direction toward the chamber 10 whereby the scraper 31 removes the positive sheet and the remnant of the film unit (the trap for surplus processing agent is located at the forward end of the remnant) advances into the chamber 10 via second opening 9 in the corresponding side wall of the cassette 102A. The duct 28 (which is then held in the second end position) directs the leader of the remnant against the bottom wall or rear wall 102AA of the cassette 102A whereby the remnant is flexed and normally assumes an undulate shape. Shortly prior to completion of introduction of the remnant into the waste chamber 10, the compacting device 29 is set in motion, i.e., it is moved toward, through and beyond the opening 9 so as to compact the freshly introduced remnant in the chamber 10 and to extract the trailing end of the remnant (namely, the leader of the respective film unit) from the nip of the pressure applying rolls 26, 27. Such trailing end of the remnant is pushed into the chamber 10.

As the number of remnants in the chamber 10 increases, the latter is filled to a progressively increasing extent but its volume suffices to store all of the remnants because the elastically suspended plate or partition 11 moves toward the aperture 102a as the number of unexposed film units in the cassette 102A decreases. Satisfactory filling of the chamber 10 and adequate compacting of the remnants is enhanced by the fact that the remnants are wet and hence readily deformable during introduction into the chamber 10. When a positive sheet is removed from the second portion or remnant of a film unit during transport of the corresponding remnant into the chamber 10, the underside of the negative sheet (such negative sheet constitutes a component part of the remnant) carries a certain amount of liquid which contacts the peripheral surface of the pressure applying roll 27. Such liquid is removed by the wiping device 30. However, the rate of transfer of liquid from the underside of the negative sheet onto the peripheral surface of the roll 27 is relatively low for several reasons. First of all, the end portions of the rolls 26, 27 are preferably provided with larger-diameter beads (see the bead 27A in FIG. 8) which ensure that the peripheral surfaces of these rolls define a relatively narrow gap of the passage of the strip S and of the major part of each film unit. Secondly, the remnant of each film unit normally comprises a customary frame for the positive sheet (reference may be had to U.S. Pat. No. 3,767,404 which shows the frame in FIGS. 1 and 2) which maintains the liquid-coated underside of the negative sheet out of direct contact (or in minimal contact) with the peripheral surface of the roll 27. Therefore, a simple and relatively small wiping device 30 can be used for a long period of time. The bead 27A at one axial end of the pressure applying roll 27 shown in FIG. 8 may constitute a gear which mates with a similar gear on the roll 26 to ensure full synchronization of angular movements of the two pressure applying rolls.

FIG. 9 illustrates a portion of a third photographic apparatus which is constructed and assembled in such a way that each and every film unit is completely extracted from the cassette (FIG. 9 shows a cassette 102A) and the second portion or remnant of each film unit is thereupon reintroduced into the cassette (namely, into the waste chamber 10) by suitable rotary transporting means. The reintroduction of second portions of the film units (namely, of remnants of the film units) into the cassette 102A takes place upon elapse of the interval which is needed for completion of development of the images. An advantage of the photographic apparatus of FIG. 9 is that it can utilize cassettes of all kinds including cassettes of the type shown in FIG. 3.

As shown in FIG. 9, the third photographic apparatus comprises a further rotary element 32 (hereinafter called advancing roll) which is absent in the apparatus of FIG. 7. The roll 32 cooperates with the pressure applying roll 27 to advance the remnant of a film unit unto the chamber 10 via opening 9 upon completion of extraction of the entire film unit from the cassette 102A and upon separation of the positive sheet from the negative sheet. Once the positive sheet is removed, the introduction of the remnant into the waste chamber 10 takes place substantially in the same way as described in connection with FIGS. 7, 8, 8a except that the remnant is transported rearwardly by the rolls 27, 32 rather than by the rolls 26, 27.

The apparatus of FIG. 9 exhibits the additional advantage that it need not employ a reversible prime mover for the pressure applying rolls 26, 27 and that the duct 28 of FIG. 7 can be dispensed with. Still further, the apparatus of FIG. 9 is less likely to permit pronounced and rapid contamination of the pressure applying roll 27 by the fluid processing agent which costs the underside of the negative sheet in the remnant travelling toward and into the waste chamber 10 because the remnant of each film unit can be adequately folded at the right-hand side of the set of rolls 26, 27, 32 (as viewed in FIG. 9) so that the rolls 27, 32 are less likely to be contacted by liquid. Still further, the apparatus of FIG. 9 can be used for the making of exposures at a higher frequency than the apparatus of FIG. 7 because there is no need to perform several operations which are necessary in the apparatus of FIG. 7 (such as pivoting the duct 28, reversing the direction of rotation of the rolls 27, 28, and actuating the switch 33).

It is further possible to modify the photographic apparatus of FIG. 9 so as to incorporate therein certain features of the apparatus of FIG. 7. For example, the apparatus of FIG. 9 can be equipped with a duct or chute and with a reversible prime mover for the pressure applying rolls 26, 27. Such apparatus can be operated in a manner as described in connection with FIG. 7 or in a manner as described in connection with FIG. 9. Its advantage is that the manipulation is simpler; this is desirable when the number of consecutive exposures is small and also because the apparatus allows for the making of exposures at a relatively high frequency.

It is clear that a photographic apparatus which comprises three rolls (such as the rolls 26, 27, 32 of FIG. 9) can also use cassettes of the type shown in FIG. 1, i.e., cassettes wherein the waste chamber (4) is disposed between the stacks of positive and negative sheets.

FIGS. 10, 11 and 12 illustrate a portion of a fourth photographic apparatus which can accept cassettes containing so-called monopanel film units. Each film unit 36 comprises a card or carrier for a layer and for a pod 36b which contains a supply of fluid processing agent. Still further, each carrier supports a trap 36c for the surplus of fluid processing agent. Each film unit 36 further comprises a light-transmitting sheet 36a which faces the light-admitting aperture 46a and transmits scene light for the making of an image. When the exposure is completed, the image is visible on the sheet 36a, i.e., on the first portion of the exposed and developed film unit 36. The longitudinally extending marginal portions of the sheet 36a (hereinafter called cover sheet) are separably bonded (e.g., by a suitable adhesive) to the remnant (second portion) of the respective film unit. The discharge end of the pod 36b is located between the two interconnected sheets of the film unit 36 so that the fluid which issues from the pod can flow only between the two sheets. In the region of the trap 36c, the path for the flow of fluid is configured in the same way, i.e., the fluid in the space between the two sheets can flow only into the trap of the respective film unit. The leading and trailing ends of the cover sheet 36a have sharp edges 36a' which are slightly spaced apart from the remnant of the respective film unit so that a scraper with a sharp blade which moves along the film unit or vice versa can readily separate the cover sheet 36a from the remnant of the film unit. The terms "leading end" and "trailing end" denote those ends of the cover sheet which are located forwardly and behind, as considered in the direction of transport of a film unit from the cassette. Such separation of the cover sheet by a scraper is facilitated due to the fact that the cover sheet can be readily detached from the remnant of the respective film unit in response to flexing along a relatively sharp edge or about a small roll, i.e., the flexing terminates or weakens the adhesive bond between the longitudinally extending marginal portions of the cover sheet 36a and the other sheet of the film unit.

The stack of film units 36 is stored in a container or cassette 46 whose front wall is formed with the light-admitting aperture 41a. The right-hand side wall of the cassette is formed with an opening 46b which is adjacent to the pods 36b, and the front and left-hand side walls of the cassette are formed with a relatively small second opening 46c which is adjacent to the traps 36c. The opening 46c serves for admission of a hook-shaped expelling member 146c which constitutes a pusher and advances the film units 36 into the nip of the pressure applying rolls 34, 35.

The stack of film units 36 is supported by a substantially rigid intermediate plate 37 which is mounted on curved leaf springs 38, 39. These springs are secured to the cassette 46 and are prestressed in response to insertion of a stack of film units 36 so that they urge the intermediate plate 37 in a direction toward the light-admitting aperture 46a. The mounting of leaf springs 38, 39 in the cassette 46 is such that remnants of film units which are introduced through an opening 46d in the right-hand side wall of the cassette 102A at a level below the opening 46b (as viewed in FIG. 10) are caused to accumulate on top of each other, i.e., the remnants form a stack in the waste chamber 10 between the intermediate plate 37 and the bottom wall of the cassette 46.

The cassette 46 is removably installed in a housing which forms part of a photographic apparatus and carries a hinge 40a serving as a means for articulately connecting the main portion 40 of the housing with a second portion here shown as a pivotable holder or flap 41. The latter supports the pressure applying rolls 34, 35 which are driven by an electric motor, as well as a pair of advancing rolls 43, 44. The pressure applying rolls 34, 35 further serve to withdraw film units 36 from the cassette 46, and their nip is located between the opening 46b of the cassette 46 (the opening 46b serves as a passage for removal of film units from the cassette) and an opening 41c in the holder 41. The opening 41c is sealable against entry of any light by a flexible or pivotable closure 42.

As best shown in FIG. 12, the holder 41 is formed with an inlet in the form of a slot 41a which extends at right angles to the planes of film units 36 in the cassette 46. The slot 41a communicates with a compartment for a separating device 45 which strips the positive sheets from the remnants of the respective film units 36. The remnant of a film unit then advances into the nip of the advancing rolls 43, 44 which are driven by an electric motor and define an arcuate portion of the path along which the remnant of a film unit 36 advances to enter the waste chamber 10 in the cassette 46. The axes of the advancing rolls 43, 44 are not disposed in a plane which is normal to the planes of film units 36 in the cassette 46; their mutual positions are such that the remnant which enters the nip of and advances beyond the rolls 43, 44 moves against the inner side of the bottom wall of the cassette 46. That roll (43) of the second pair which is more distant from the bottom or rear wall of the cassette 46 has a roughened or analogous peripheral surface (e.g., such peripheral surface can be formed with alternating elongated ribs and grooves or hills and valleys which extend in parallelism with the axis of the roll 43). The roll 43 is adjacent to the convex side of the aforementioned arcuate portion of the path along which the rolls 43, 44 advance the remnants of film units 36 from the slot 41a into the waste chamber 10.

The separating device 45 comprises a curved cylindrical separating element 45A which is pivotable about the common axis of two shafts 45a (indicated by phantom lines). The common axis of the shafts 45a is located in front of the concave side of the element 45A in such position that, when a film unit is introduced into the interior of the holder 41 via slot 41a (i.e., upwardly, as viewed in FIG. 12), the film unit pivots the element 45A clockwise from the position of FIG. 10 to the position of FIG. 12, i.e., toward the advancing rolls 43, 44. The element 45A is normally held in the idle position of FIG. 10 by a relatively weak hairpin spring, not shown. The element 45A is located in front of a second slot 41b which serves as an outlet to guide the separated positive sheet of a film unit 36 in a direction out of the interior of the holder 41. The interior of the holder 41 further accommodates an electric switch 146 which is shown in FIG. 11 and is connected in circuit with the electric motor M for the rolls 43, 44. When the element 45A is pivoted to the operative position of FIG. 12, the switch 146 is actuated to start the motor M, i.e., to set the rolls 43, 44 in motion in a direction to advance the remnant of a film unit 36 into the waste chamber 10.

If desired, the two discrete motors for the rolls 34, 35 and 43, 44 can be replaced with a single motor. This is advisable for reasons of economy and also because the rolls 34, 35 need not rotate when the advancing rolls 43, 44 are driven and vice versa. No harm is done if the rolls 34, 35 rotate when the rolls 43, 44 are driven or vice versa; therefore, a single motor M can continuously drive all four rolls or it can drive the rolls 34, 35 or 43, 44 whenever the rolls 43, 44 or 34, 35 are idle. This will be readily appreciated by bearing in mind that the rolls 34, 35 serve to extract successive film units 36 from the interior of the cassette 46 (as well as to simultaneously cause the corresponding pod 36b to burst open and to spread the contents of such pod between the two sheets of the corresponding film unit) and the rolls 43, 44 serve to advance the remnants of film units into the waste chamber 10.

The operation of the photographic apparatus which embodies the structure of FIGS. 10, 11 and 12 is as follows:

A freshly exposed film unit 36 is partially expelled from the interior of the cassette 46 by the aforementioned hook-shaped member 146c which enters the cassette via opening 46c shown to the left of the light-admitting aperture 46a, as viewed in FIG. 10. The member 146c advances the freshly exposed uppermost film unit 36 to such an extent that the leader of the film unit enters the nip of the pressure applying rolls 34, 35, i.e., the leader advances toward, through and beyond the opening 46b in the right-hand side wall of the cassette 46, as viewed in FIG. 10. The motor M drives the rolls 34, 35 so that they engage and entrain the freshly exposed film unit 36. The leader of such film unit deflects the closure 42 and issues from the interior of the holder 41 via opening 41c. The pod 36b of the film unit bursts open during passage between the rolls 34, 35 whereby the rolls cause the processing agent which issues from the pod to spread uniformly between the two sheets of the film unit 36, namely, between the cover sheet 36a and the carrier. When the developing step is completed (the completion of such developing step can be ascertained by observing the exposed surface of the cover sheet 36a or by resorting to a timer which generates a signal after a preselected interval which invariably suffices to insure completion of the developing step), the user fully extracts the freshly exposed and developed film unit 36 from the nip of the rolls 34, 35 (such full or final extraction can take place with any desired delay after completion of the developing step) and inserts the thus removed film unit into the housing 40, 41 via slot 41a. The exposed side of the cover sheet 36a of such film unit faces in a direction to the right, as viewed in FIG. 12. The front edge 36a' of the cover sheet 36a is engaged by the sharp edge of the separating element 45A and, as the user continues to push the film unit 36 upwardly, as viewed in FIG. 12, the element 45A is pivoted clockwise about the common axis of the shafts 45a whereby the leader of the carrier of the film unit 36 enters the nip of the rolls 43, 44 and the pivoted element 45A actuates the switch 146 which starts the motor M for the rolls 43, 44. These rolls advance the carrier, the open pod and the trap of the film unit into the chamber 10 via opening 46d whereas the cover sheet 36a (which carries the exposed and developed image) advances into and beyond the outlet slot 41b to be accessible to the user of the photographic apparatus. As mentioned above, the adhesive bond between the longitudinally extending marginal portions of the cover sheet 36a and the carrier of the film unit 36 is weakened in response to flexing of the film unit by the element 45A which steers the leader of the carrier into the nip of the rolls 43, 44. This promotes separation of the cover sheet 36a from the carrier. The separating action is further promoted by the profile of the edge of the element 45A (see FIG. 11) which recedes from the ends toward the center. Thus, during the initial stage of contact, the element 45A engages only the marginal portions of the cover sheet 36a. As the advancement of the film unit 36 (upwardly, as viewed in FIG. 11) progresses, the element 45A engages the cover sheet 36a along the full width of the latter and the cover sheet is caused to issue from the interior of the holder 41 via outlet slot 41b. If the insertion of a freshly exposed and developed film unit 36 into the slot 41a of the holder 41 takes place immediately or shortly after elapse of the minimum interval which is needed to insure completion of the developing step, the cover sheet 36a which issues from the holder 41 via slot 41b is or can be still somewhat wet; however, such cover sheet is fully separated from the remnant of the respective film unit 36, namely, from the carrier sheet, pod and trap. The sheet 36a is not or need not be thicker than conventional positive sheets of film units and, therefore such cover sheets can be readily kept in albums for storage of other types of reproductions of subjects or scenes.

The exact timing of separation of the cover sheet 36a from the remnant of the respective film unit 36 depends on the nature of the chemical process which takes place during development of the image. As a rule, the interval between completion of development and separation of the cover sheet 36a from the remnant of the respective film unit 36 can be relatively long. All that counts is to avoid excessive delays between the completion of development and separation of cover sheets 36a because the separation is more difficult if the film unit is allowed to become completely dry before the cover sheet 36a is separated from the carrier sheet.

If the quality of the exposed and developed image is unsatisfactory and the entire film unit is to be disposed of, it is only necessary to insert the leader of the film unit 36 in inverted position, i.e., the leader of the film unit must be inserted into the slot 41a in such a way that the cover sheet 36a faces in a direction to the left, as viewed in FIG. 11. This means that the edge of the separating or scraping element 45A cannot engage the upper edge 36a' of the cover sheet 36a and the latter is caused to enter the chamber 10 via nip of the advancing rolls 43, 44 and opening 46d. Since the film units 36 consist of substantially mirror symmetrical halves, they can be introduced into the slot 41a in such a way that the traps 36a are located at their upper or lower ends. This holds true regardless of whether the cover sheet 36a is or need not be separated from the associated carrier sheet, i.e., regardless of whether the cover sheet 36a is to issue from the interior of the holder 41 via outlet slot 41b (because the image is satisfactory) or the entire film unit 36 is to be confined in the waste chamber 10. If the film units 36 are to be introduced into the slot 41a with their pods or traps leading, the front and rear edges of the cover sheet 36a must be sufficiently sharp to be readily engageable by the separating element 45A. Thus, by the simple expedient of making the front and rear edges of the cover sheet 36a sharp (see the edge 36a' in FIG. 12), the task of the user of the apparatus of FIGS. 10–12 is simplified because the user need not be concerned with the selection of that end of a film unit which is to be inserted into the inlet slot 41a as long as the cover sheet 36a is located at the right-hand side (as viewed in FIG. 12) when the developed image is satisfactory and the cover sheet is located at the left-hand side if the developed image is unsatisfactory so that the user wishes to dispose of the cover sheet 36a by causing it to enter the chamber 10 of the cassette 46.

The peripheral surface of the roll 44 ceases to engage the trailing end of the remnant of a film unit 36 which is in the process of entering the chamber 10 before such trailing end is advanced into and beyond the opening 46d. However, the leaf springs 38, 39 offer a certain resistance to further travel of the remnant into the chamber 10 and thereby urge the trailing end of such remnant against the ribbed peripheral surface of the roll 43 which is installed in the opening 46d at the convex side of the arcuate path for remnants of the film units 36 so that it is capable of completing the introduction of each remnant into the chamber 10. In fact, when a rib at the periphery of the roll 43 engages the rear edge face of a remnant, it enables the roll 43 to move such remnant into a position of accurate register with the previously introduced remnant so that all of the remnants are properly stacked in the waste chamber 10. This is advisable and advantageous because the properly stacked remnants occupy much less room than randomly inserted and deformed remnants.

Since the rolls 43, 44 should rotate for a period of time after the switch 146 is free to open the circuit of the motor M for these rolls, the circuit of the motor M preferably comprises a suitable time-delay device TD which ensures that the motor M remains in operation after the element 45A reassumes the end position of FIG. 10.

The supply of fresh (unexposed) film units 36 in the cassette 46 is exhausted when all of the remnants are stacked in the chamber 10. The cassette 46 is then detached or removed from the housing 40, 41 of the photographic apparatus and is discarded. This provides room for insertion or attachment of a fresh cassette 46 which contains a full stack of unexposed film units 36.

The photographic apparatus of FIGS. 10, 11 and 12 can be used with equal or practically equal advantage in connection with film units wherein the image-bearing sheets do not transmit light, i.e., wherein the exposure takes place via light-transmitting carrier sheets. In such event, the film units are stacked in inverted position, as compared with the film units 36 of FIG. 10, so that the light-transmitting carrier sheet of each film unit is nearer to the light-admitting opening 46a than the associated image-bearing (non-transparent) cover sheet. When such film units are thereupon introduced into the interior of the holder 41 via slot 41a, the operator of the photographic apparatus must ensure that the image-bearing cover sheet faces to the right, as viewed in FIG. 12, so that its leading edge can be engaged by the edge of the separating element 45A, i.e., that the image-bearing cover sheet can issue from the holder 41 via slot 41b.

An important advantage of the improved film packs, method and apparatus is that, due to separation of the first and second portions of each film unit in the region of the camera body and the introduction of remnants into the cassette, the problem of disposing with waste material which is separated from the image-bearing portions of film units is eliminated in a simple and economical way.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art, and therefore, such adaptations should and are intended to be comprehended within the meaning and range of equivalence of the appended claims.

I claim:

1. In a photographic apparatus for exposure and development of self-processing film units which are stored in a container during exposure to scene light while the container is confined in the apparatus, wherein each film unit comprises an image-bearing first portion and a second portion which is separable from the first portion and constitutes waste material upon completion of development of the respective film unit and subsequent separation from the first portion, and wherein the development of film units involves spreading a fluid processing agent between the first and second portions of the respective units, the combination of means for supporting containers with film units; means for introducing separated second portions of exposed and developed film units into the respective container while the latter is supported by said supporting means, said supporting means including a housing which confines a container during exposure of the respective film units to scene light as well as during introduction of separated second portions of film units into the respective container; and pressure applying means installed in said housing and operative to apply pressure to successive exposed film units externally of the respective container, said introducing means including a displacing member which is insertable into and retractible from said housing and a tongs secured to said displacing member and having jaws actuatable to engage the second portion of a film unit which is in contact with said pressure applying means to move such second portion into the respective container in response to insertion of said displacing member into said housing.

2. The combination of claim 1 for exposure and development of self-processing film units in containers of the type having a waste chamber, wherein said introducing means includes means for inserting the separated second portions of exposed and developed film units into the waste chambers of the respective containers.

3. The combination of claim 1, wherein said introducing means includes means for holding exposed film units during development of images on the first portions of such units.

4. The combination of claim 1, wherein said displacing member includes a substantially U-shaped yoke and is movable to and from a position of substantial parallelism with film units in the container within said housing, said yoke being insertable into and retractible from said housing upon movement to said position of substantial parallelism with a film unit in the container within said housing.

5. The combination of claim 4, wherein said tongs comprises a substantially trapeziform lever which is articulately connected with said yoke and includes one of said jaws, said one jaw being disposed in the interior of the container within said housing when yoke is located in said retracted position.

6. The combination of claim 4, wherein said yoke has a plurality of legs and said legs are pivotable about a predetermined axis to move said yoke to and from said position of substantial parallelism with the film units in the container within said housing.

7. The combination of claim 6, further comprising guide means for said legs, said guide means being installed in said housing and being pivotable about said predetermined axis to move said yoke between said position of substantial parallelism with the film units in the container within said housing and a position in which said yoke makes with such film units an acute angle.

8. The combination of claim 7, wherein said acute angle is approximately 30 degrees.

9. The combination of claim 7, further comprising means for preventing full extraction of said legs from said guide means.

10. The combination of claim 9, wherein said means for preventing includes portions of said legs, said portions of said legs abutting against the respective guide means in the extended position of said yoke.

11. The combination of claim 7, wherein said pressure applying means comprises rolls rotatably mounted in said housing and means for biasing one of said rolls against another of said rolls, said guide means including means for disengaging said one roll from said other roll against the opposition of said biasing means when said yoke is held in said position of substantial parallelism with film units in the container within said housing.

12. The combination of claim 4, further comprising abutment means for preventing the insertion of said yoke into said housing when said yoke is moved away from said position of substantial parallelism with the film units in the container within said housing.

13. The combination of claim 4, further comprising abutment means for preventing the movement of said yoke from said position of substantial parallelism with film units in the container within said housing when said yoke is out of the fully retracted position.

14. The combination of claim 4, wherein said tongs includes a substantially trapeziform lever pivotally mounted on said yoke and including one of said jaws, and a gripping member pivotally mounted on said lever and including another of said jaws.

15. The combination of claim 14, wherein said jaws are adjacent to said pressure applying means in the retracted position of said yoke and said gripping member is pivotable relative to said lever to and from a predetermined position in which said one jaw and said other jaw are disengaged from the film unit which is engaged by said pressure applying means.

16. The combination of claim 15, wherein said gripping member is substantially coplanar with said lever in said predetermined position thereof.

17. The combination of claim 1, further comprising means for compacting the second portions of film units in the interior of a container within said housing.

18. The combination of claim 17, wherein said compacting means includes a member which is reciprocable into and from the interior of the container within said housing.

19. In a photographic apparatus for exposure and development of self-processing film units which are stored in a container during exposure to scene light while the container is confined in the apparatus, wherein each film unit comprises an image-bearing first portion and a second portion which is separable from the first portion and constitutes waste material upon completion of development of the respective film unit and subsequent separation from the first portion, and wherein the development of film units involves spreading a fluid processing agent between the first and second portions of the respective units, the combination of means for supporting containers with film units; and means for introducing separated second portions of exposed and developed film units into the respective container while the latter is supported by said supporting means, said supporting means including a housing which confines a container during exposure of the respective film units to scene light as well as during introduction of separated second portions of film units into the respective container, said introducing means including pressure applying rolls rotatably installed in said housing and being operative to engage and entrain successive film units from the container within said housing while rotating in a first direction and to introduce the second portions of film units into the container within said housing while rotating in a second direction, reversible prime mover means for said rolls, and means for reversing said prime mover means.

20. The combination of claim 19, wherein said prime mover means includes an electric motor and said reversing means includes electric switch means.

21. The combination of claim 19 for exposure and development of film units having relatively thick trailing ends, said rolls defining a nip through which the film units advance during entrainment from the container within said housing, said nip being sufficiently narrow to prevent the passage of the trailing end of a film unit so that the progress of a film unit in a direction to leave said housing is terminated when said rolls are engaged by the respective trailing end.

22. The combination of claim 19, further comprising guide means installed in said housing and movable between a first position in which said guide means defines a path for movement of a film unit from the container within said housing into the range of said rolls and a second position in which said guide means defines a second path for introduction of second portions of film units from the region of said rolls into the container within said housing, said reversing means being actuatable by said guide means to reverse the direction of rotation of said rolls from said first to said second direction in response to movement of said guide means to said second position.

23. The combination of claim 22 wherein said guide means includes a duct.

24. The combination of claim 22 for exposure and development of film units in containers having a waste chamber and a wall adjacent to said waste chamber, said guide means being arranged to direct the second portions of film units against said wall in said second position thereof.

25. The combination of claim 22, further comprising means for moving said guide means between said first and second positions.

26. The combination of claim 25, wherein said means for moving said guide means is located externally of said housing and is actuatable by hand.

27. In a photographic apparatus for exposure and development of self-processing film units which are stored in a container during exposure to scene light while the container is confined in the apparatus, wherein each film unit comprises an image-bearing first portion and a second portion which is separable from the first portion and constitutes waste material upon completion of development of the respective film unit and subsequent separation from the first portion, and wherein the development of film units involves spreading a fluid processing agent between the first and second portions of the respective units, the combination of means for supporting containers with film units; means for introducing separated second portions of exposed and developed film units into the respective container while the latter is supported by said supporting means, said supporting means including a housing which confines a container during exposure of the respective film units to scene light as well as during introduction of separated second portions of film units into the respective container; and means for compacting the second portions of film units in the interior of a container within said housing, including a member which is reciprocable into and from the interior of the container within said housing, said introducing means including a plurality of pressure applying rolls and means for rotating said rolls, said rotating means being operative to reciprocate said member of said compacting means.

28. In a photographic apparatus for exposure and development of self-processing film units which are stored in a container during exposure to scene light while the container is confined in the apparatus, wherein each film unit comprises an image-bearing first portion and a second portion which is separable from the first portion and constitutes waste material upon completion of development of the respective film unit and subsequent separation from the first portion, and wherein the development of film units involves spreading a fluid processing agent between the first and second portions of the respective units, the combination of means for supporting containers with film units; means for introducing separated second portions of exposed and developed film units into the respective container while the latter is supported by said supporting means, said supporting means including a housing which confines a container during exposure of the respective film units to scene light as well as during introduction of separated second portions of film units into the respective container; and means for compacting the second portions of film units in the interior of a container within said housing, including a member which is reciprocable into and from the interior of the container within said housing, said introducing means including a plurality of rotary elements one of which transmits motion to said compacting means.

29. In a photographic apparatus for exposure and development of self-processing film units which are stored in a container during exposure to scene light while the container is confined in the apparatus, wherein each film unit comprises an image-bearing first portion and a second portion which is separable from the first portion and constitutes waste material upon completion of development of the respective film unit and subsequent separation from the first portion, and wherein the development of film units involves spreading a fluid processing agent between the first and second portions of the respective units, the combination of means for supporting containers with film units; means for introducing separated second portions of exposed and developed film units into the respective container while the latter is supported by said supporting means, said supporting means including a housing which confines a container during exposure of the respective film units to scene light as well as during introduction of separated second portions of film units into the respective container; and pressure applying means installed in said housing and operative to apply pressure to successive exposed film units externally of the respective container, said introducing means including rotary advancing means operative to move the second portions of exposed and developed film units into the container within said housing.

30. The combination of claim 29 for exposure and development of film units in containers having waste chambers, wherein said rotary advancing means is operative to introduce said second portions of exposed and developed film units into the waste chamber of the container within said housing.

31. The combination of claim 30, further comprising means for rotating said rotary advancing means in a predetermined direction during introduction of second portions of film units into the container within said housing.

32. The combination of claim 29, further comprising compacting means operative to assist in introduction of second portions of film units into the container within said housing.

33. The combination of claim 29 for exposure and development of film units of the type wherein one portion of each film unit includes a light-transmitting sheet, wherein said pressure applying means includes means for withdrawing exposed film units from the container within said housing and from said housing, said housing having an inlet for reintroduction of the withdrawn exposed and developed film units and said inlet being arranged to admit the second portions of the thus reinserted film units into the range of said advancing means.

34. The combination of claim 33, further comprising separating means disposed in said housing in the path of movement of film units which are admitted via said inlet so as to separate the first portions from the second portions of the reintroduced film units.

35. The combination of claim 34, wherein said separating means includes a device for directing the second portions of film units into the range of said advancing means.

36. The combination of claim 35, wherein said separating device has a cylindrically curved elongated separating portion which recedes from the ends toward the center thereof and is pivotable about a predetermined axis in response to engagement by a film unit which is admitted via said inlet so as to bear against the advancing film unit and to thereby separate the first portion from the respective second portion.

37. The combination of claim 36, wherein said separating portion has a concave side behind said predetermined axis, as considered in the direction of admission of film units via said inlet.

38. The combination of claim 36, further comprising means for yieldably biasing said device to a predetermined position which said device assumes in the absence of introduction of a film unit via said inlet.

39. The combination of claim 34, wherein said housing has a rear wall and a side wall, said inlet being provided in said rear wall to admit film units in a direction substantially at right angles to the planes of film units in the interior of the container within said housing and said housing having an outlet provided in said side wall to permit a separated first portion of the film unit which is admitted via said inlet to leave said housing.

40. The combination of claim 34, wherein said separating means includes a device installed in said housing and being movable by film units which are admitted via said inlet, and further comprising means for driving said rotary advancing means in response to movement of said device by a film unit so that the advancing means moves the second portions of film units into the container within said housing.

41. The combination of claim 40, wherein said driving means comprises an electric motor and an electric switch in circuit with said motor and actuatable by said device in response to introduction of a film unit into said housing via said inlet to start said motor in a direction to rotate said advancing means whereby the latter introduces the second portion of a film unit into the container within said housing.

42. The combination of claim 29, wherein said advancing means comprises a plurality of rolls and at least one of said rolls has a roughened peripheral surface for engagement with the trailing end of a second portion after the latter is at least partially introduced into the container within said housing.

43. The combination of claim 42, wherein said rolls define an arcuate path along which the second portions of film units which are admitted via said inlet advance into the container within said housing, said path having a concave side and a convex side and said one roll being located at the convex side of said path.

* * * * *